US005732738A

United States Patent [19]

Graham

[11] Patent Number: 5,732,738

[45] Date of Patent: Mar. 31, 1998

[54] VALVE TRIM

[75] Inventor: Gary E. Graham, Williamsport, Pa.

[73] Assignee: BW/IP International of Pennsylvania, Inc., Long Beach, Calif.

[21] Appl. No.: 668,574

[22] Filed: Jun. 20, 1996

[51] Int. Cl.[6] .......... F16K 3/34

[52] U.S. Cl. .......... 137/625.33; 251/127

[58] Field of Search .......... 137/625.3, 625.33; 251/127

[56] References Cited

U.S. PATENT DOCUMENTS 3,529,628 9/1970 Cummins .......... 137/625.3
3,780,767 12/1973 Borg et al. .......... 137/625.3
4,047,540 9/1977 Orme et al. .......... 137/239

FOREIGN PATENT DOCUMENTS 0184381 10/1983 Japan .......... 137/625.3

*Primary Examiner*—John Fox
*Attorney, Agent, or Firm*—Bruce H. Johnsonbaugh

[57] ABSTRACT

A valve trim is provided for a flow control valve wherein a plurality of perforated plates are stacked together. Each plate has a series of hole patterns formed therein, including a repeating pattern of four offset rectangular holes. As the plates are assembled, each plate is rotated in the same direction so that the hole patterns create tortuous pathways that include multiple episodes of change of direction, sudden contraction and sudden expansion of the high pressure fluid as well as forcing the fluid to flow through two or more of the plates.

7 Claims, 5 Drawing Sheets

31 41 21 32 42 22 43 23 33 44 45 24 34 95 25 81 82 46 26 36 83 84

VALVE TRIM

BACKGROUND AND BRIEF SUMMARY OF THE INVENTION

This invention relates generally to a valve trim design. More particularly, the present invention is related to a particular valve trim design which offers high performance, high flexibility of design and ease of manufacture and service.

Various types of valve trim mechanisms are known in the prior art. The designs are intended to allow fluids to go from a high pressure to a low pressure, through a control valve, without causing damage to the valve or piping and without creating excessive noise. Generally, valve trim designs are intended to dissipate the energy of high pressure fluid while simultaneously avoiding cavitation. The energy in the high pressure fluid is in three main forms: pressure, temperature and velocity. As the high pressure fluid passes through a control valve, the total amount of energy remains the same but new forms of energy such as noise vibration and cavitation can also appear.

The three primary approaches of dissipating the energy in high pressure fluid includes sudden expansions, sudden contractions and changes in direction.

An example of a prior art design is the Hoof U.S. Pat. No. 4,267,045 dated May 12, 1981. That patent teaches a plurality of disks stacked together. Each disk includes a labyrinth design through which the fluid passes, as shown in FIG. 3 of the patent. The fluid is subjected to a tortuous path through a single disk which tends to dissipate the energy. However, the primary drawback of the Hoof teaching is that each plate or disk is relatively expensive to manufacture.

The prior art also includes the Baumann U.S. Pat. No. 4,356,843 dated Nov. 2, 1982. That patent also teaches the use of a stack of flat ring-shaped plates. Each of the plates, as shown best in FIG. 2, has a wedge-shaped perforation formed, which extends from the inner edge to the outer edge of the plate. That design allows a rather straightforward path for the fluid to traverse. A more tortuous path would be desirable.

According to the present invention, a stack of ring-shaped plates is provided wherein each plate is simple in design and relatively inexpensive to manufacture, but which in its assembled form provides a series of tortuous paths. The present invention provides that each pathway includes at least two of the plates so that as the fluid passes between the inner and outer edges of the stack, the fluid flows through at least two plates, as distinguished from the flow paths shown in U.S. Pat. Nos. 4,2267,045 and 4,356,843 discussed above wherein the fluid passes through only one of the plates in the stack.

Another significant advantage of the present invention is that the design of each of the plates can be readily changed to alter the performance characteristics to meet the needs of the particular application. Those changes include the thickness of each plate, the number of radial paths, the size, spacing and number of holes in each hole pattern, changing the width of the plates, changing the size of the central hole, changing the outside diameter of the plates, as well as changing the surface finish of the sides of the holes.

Another significant advantage of the present invention is that the design includes in each fluid pathway four methods of introducing turbulence into the high pressure fluid which are: changes in flow direction, sudden contractions, sudden expansions, and friction against passageway walls.

A primary object of the present invention is to provide a high performance valve trim design which is inexpensive to manufacture, has a design readily changeable for different applications and which is simple in design.

A further object of the invention is to provide a valve trim design which may be readably disassembled to be cleaned or serviced.

A further object is to provide a high performance valve trim which provides a series of tortuous pathways which include changes in flow direction, sudden contractions, sudden expansions and friction against passageway walls.

Further objects and advantages of the invention will become apparent from the following description and drawings within:

DETAILED DESCRIPTION OF THE DRAWINGS

Figure 1:
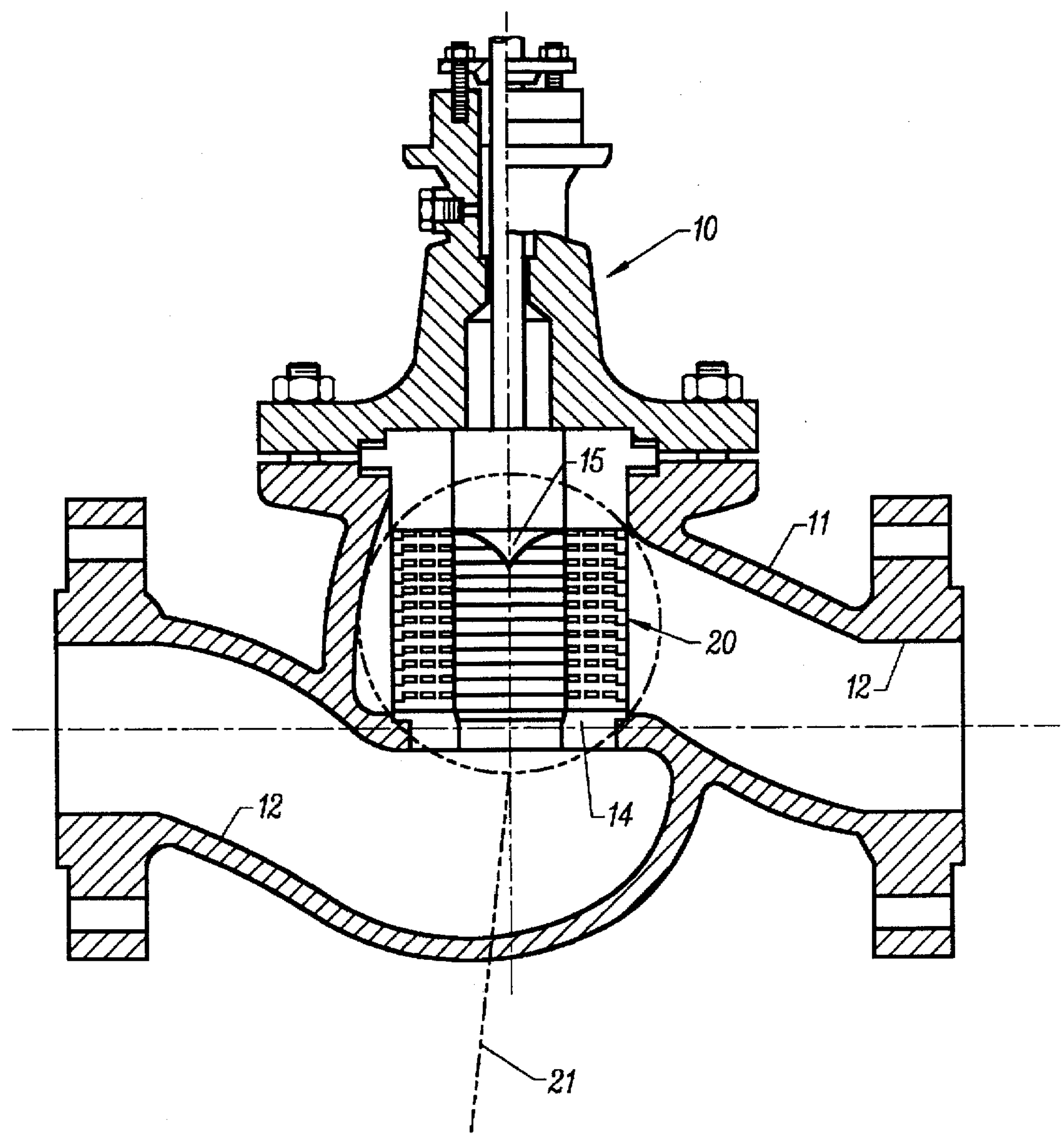
FIG. 1 is a side elevational view, partially in section, of a prior art flow control valve including a circle drawn around the prior art valve trim.

FIG. 1 shows a prior art flow control valve generally as 10 which has a body 11 with a passageway 12 extending therethrough. A seat 14 is formed in body 11 and a plug 15 is movable relative to the seat 14. Plug 15 is movable to any position between that shown in FIG. 1 and downwardly to a position where it seals against seat 14.

A prior art valve trim body shown as 20 is shown within the circle 21 and forms a cage around plug 15. Plug 15 as shown in FIG. 1 is in its extreme retracted position allowing maximum flow through passageway 12. Plug 15 is movable to any position between that shown in FIG. 1 and downwardly to a position where it seals against seat 14. It is to be understood that high pressure fluid can enter passageway 12 from either the left hand side as shown in FIG. 1 or the right hand side. The flow control valve 10 as shown in FIG. 1 as well as valve trim body 20 are bi-directional; i.e., flow of the high pressure fluid may enter passageway 12 either from the left-hand side of FIG. 1 and flow through seat 14 or alternatively may enter from the right-hand side of FIG. 1 and flow through the cage formed by the valve trim and thereafter through the seat 14.

Figure 2:
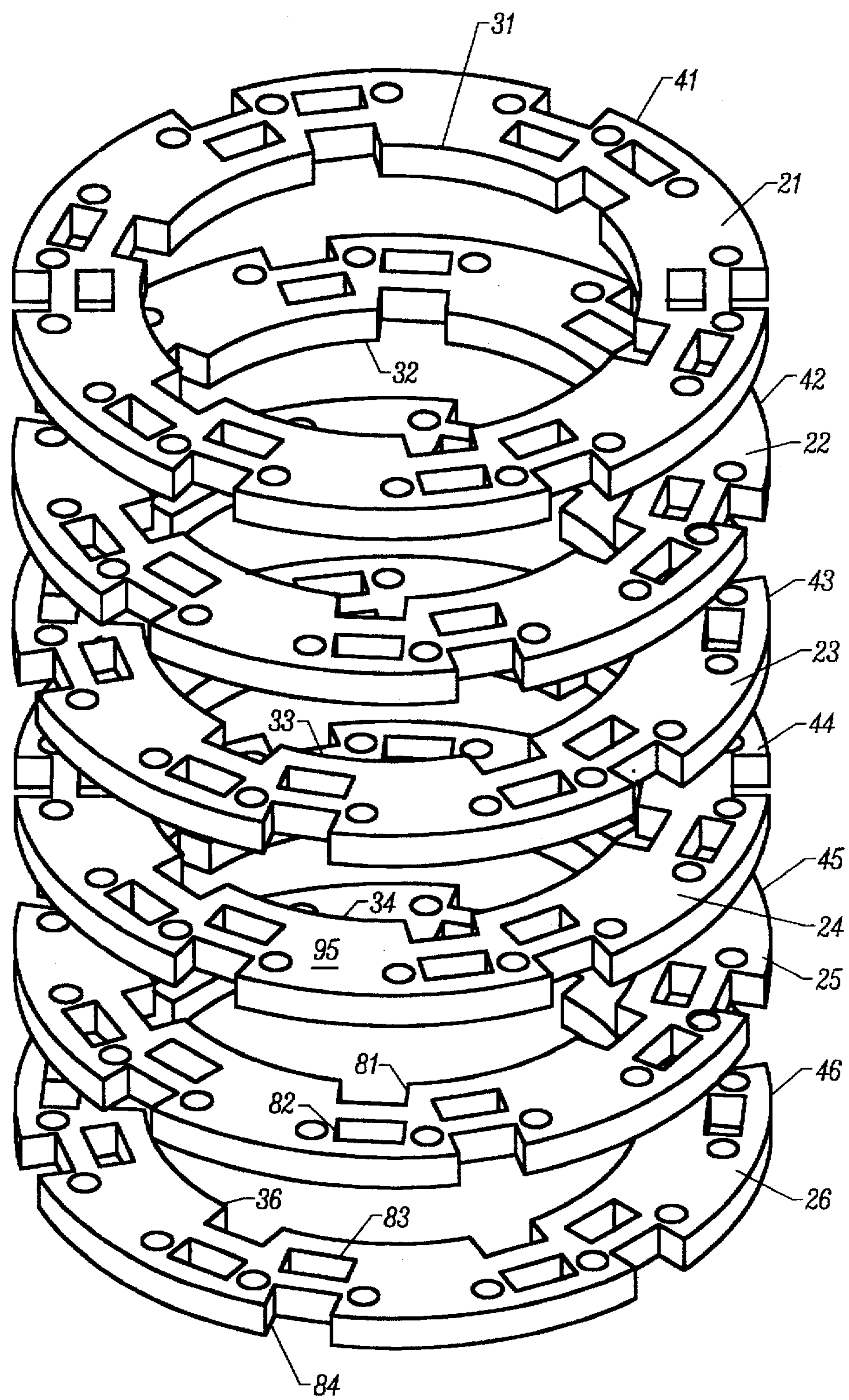
FIG. 2 is a perspective and exploded view of the internal working parts of the improved valve trim.
Figure 3:
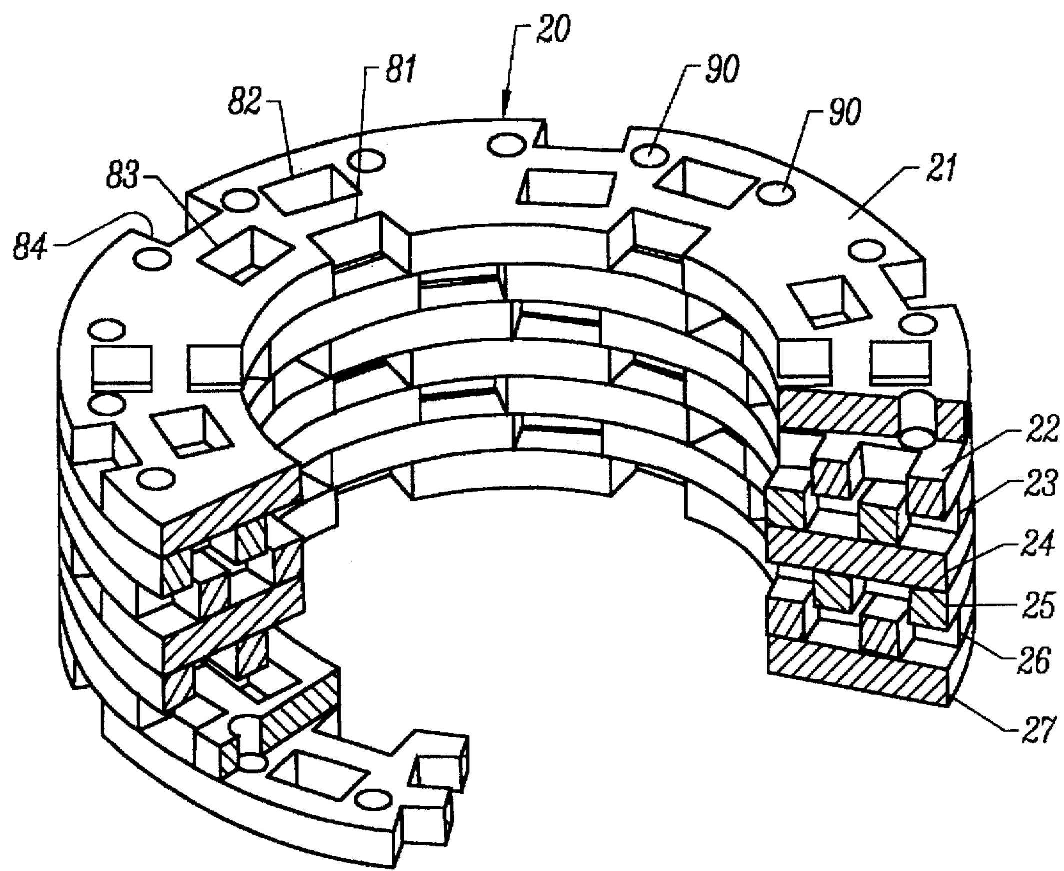
FIG. 3 is a perspective view, partially in section, of the assembled plates utilized in the valve trim of the invention.

FIGS. 2–5 show the improved valve trim according to the present invention. Referring to FIG. 2, a plurality of perforated plates 21–26 is shown in exploded view. Each of the perforated plate means 21–26 is generally ring-shaped and each has an inner edge 31–36 and an outer edge 41–46 respectively. Each of the plates 21–26 has an identical hole pattern shown best in FIG. 4. When assembled, as shown in FIG. 3, the fluid flowing through the cage referred to generally as 20 is forced to flow through at least two of the plates 21–27. FIG. 3 shows an assembly of seven plates whereas FIG. 2 shows an exploded view of six plates.

Figure 4:
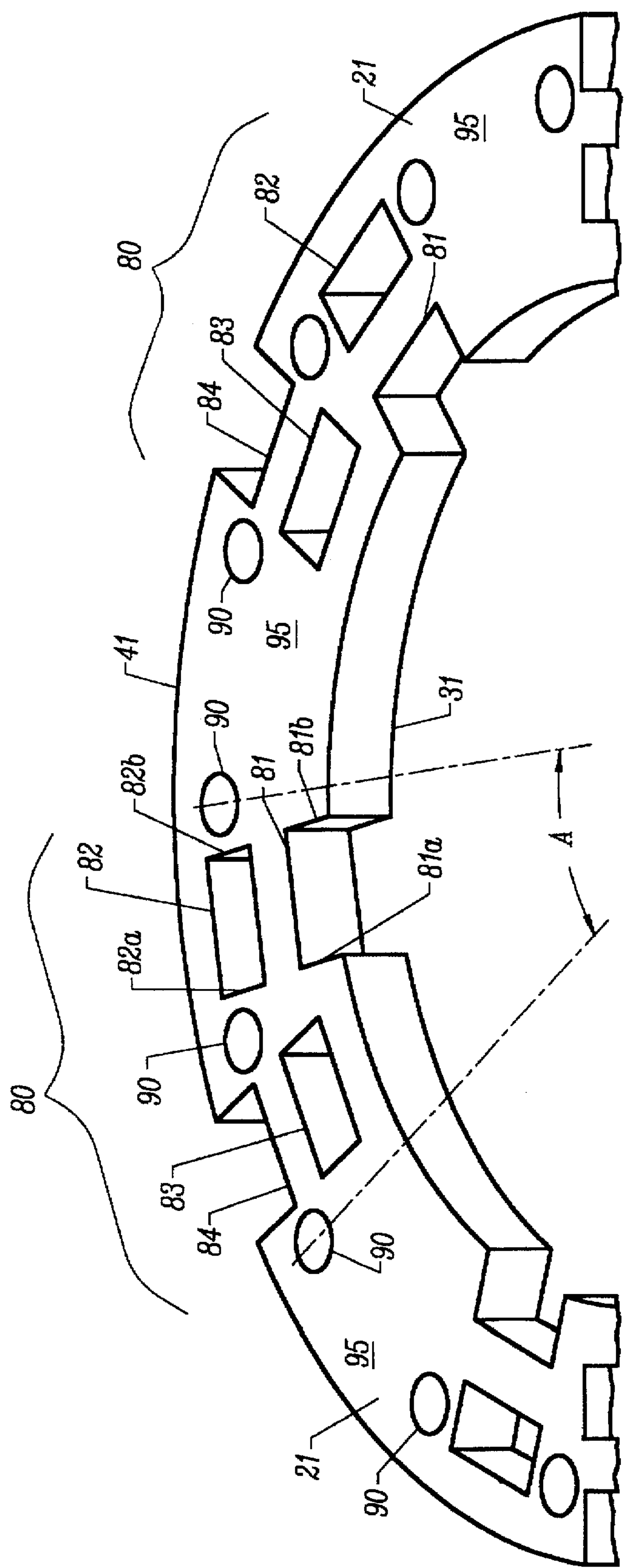
FIG. 4 is a perspective view of a portion of one of the plates shown in FIG. 2.

The preferred hole pattern is shown best in FIG. 4 wherein plate 21 is shown in a perspective view. Plate 21, as well as each of the other plates which go together to form the valve trim of the present invention, has an identical and repeating hole pattern 80 formed therein. In the embodiment shown in FIGS. 2, 3 and 4 the hole pattern 80 is repeated six times in each plate. Each pattern includes preferably four or more rectangular holes. The pattern shown in FIG. 4 includes four rectangular holes. The first hole 81 opens into the inner edge 31. The second hole 82 is angularly aligned with rectangular hole 81, meaning that its side edges 82*a* and 82*b* are aligned angularly with the side edges 81*a* and 81*b* of rectangular hole 81. The second hole 82 is located on the plate 21 between the inner edge 31 and outer edge 41 and does not open into the inner edge 31 or outer edge 41.

The pattern also includes third hole 83 and fourth hole 84. Rectangular holes 83 and 84 are angularly aligned with each other but are offset or displaced angularly from first and second holes 81 and 82. In the preferred embodiment shown in FIG. 4, the centers of third and fourth holes 83 and 84 are displaced or offset angularly 20 degrees from the centers of holes 81 and 82. In addition, third and fourth holes 83 and 84 are offset radially with respect to first and second holes 81 and 82. Fourth hole 84 communicates with and opens into outer edge 41 of the plate 21. Third hole 83 is formed entirely between inner and outer edges 31 and 41 and does not open into either the inner edge 31 or outer edge 41.

A plurality of circular holes 90 is formed in plate 21. Holes 90 receive a series of bolts, the bolts not being shown in the drawing for purposes of clarity. When the plates are assembled as shown in FIG. 3, the bolt holes are in alignment and receive bolts therethrough to hold the assembled stack together. The bolts may be readily removed and the assembly of plates shown in FIG. 3 can be disassembled for cleaning, inspection and repair.

The preferred hole design is rectangular as shown in FIG. 4 but the holes also may be of circular or other design.

As shown in FIG. 4, the hole pattern 80 subtends an arc A which in the example shown is 40 degrees. The circular bolt holes 90 are separated angularly by A/2 degrees or in the example shown in FIG. 4, 20 degrees. When the plates are assembled as shown in FIG. 3, plate 22 is rotated A/2 degrees or 20 degrees relative to adjacent plate 21 and adjacent plate 23.

Referring to FIG. 2, the tortuous flow path includes first hole 81 of plate 25. Fluid flows through first hole 81 into third hole 83 formed in adjacent plate 26. In doing so, there is a change of direction as well as a sudden contraction as high pressure fluid flows between plates 25 and 26 and then a sudden expansion. The fluid flows upwardly through third hole 83 in plate 26 into the second hole 82 of the hole pattern in plate 25. Again, as the fluid flows between plates 26 and 25, there is abrupt change of direction and a sudden contraction and expansion. The fluid then flows downwardly through rectangular hole 82 into the fourth rectangular hole 84 in plate 26. In similar fashion, the flow can run in the reverse direction to that just described. Each of the tortuous pathways formed in the assembled valve body shown in FIG. 3 is identical and each tortuous path forces the fluid to flow through at least two of the plurality of perforated plates. Each tortuous pathway includes two or more holes in one plate and two or more holes in an adjacent plate. End plates are used which have no perforations.

As shown in FIG. 4, between repeating hole patterns 80 are regions 95 without perforations. These solid regions form boundaries for each of the fluid passageways. Referring to FIG. 2, a non-perforated region 95 of plate 24 forms a boundary for fluid entering holes 81 and 82 on plate 25. Each of the tortuous pathways has upper and lower boundaries formed by either perforated region 95 or by an upper or lower endplate, the endplates not being shown on the drawings for clarity.

Figure 5:
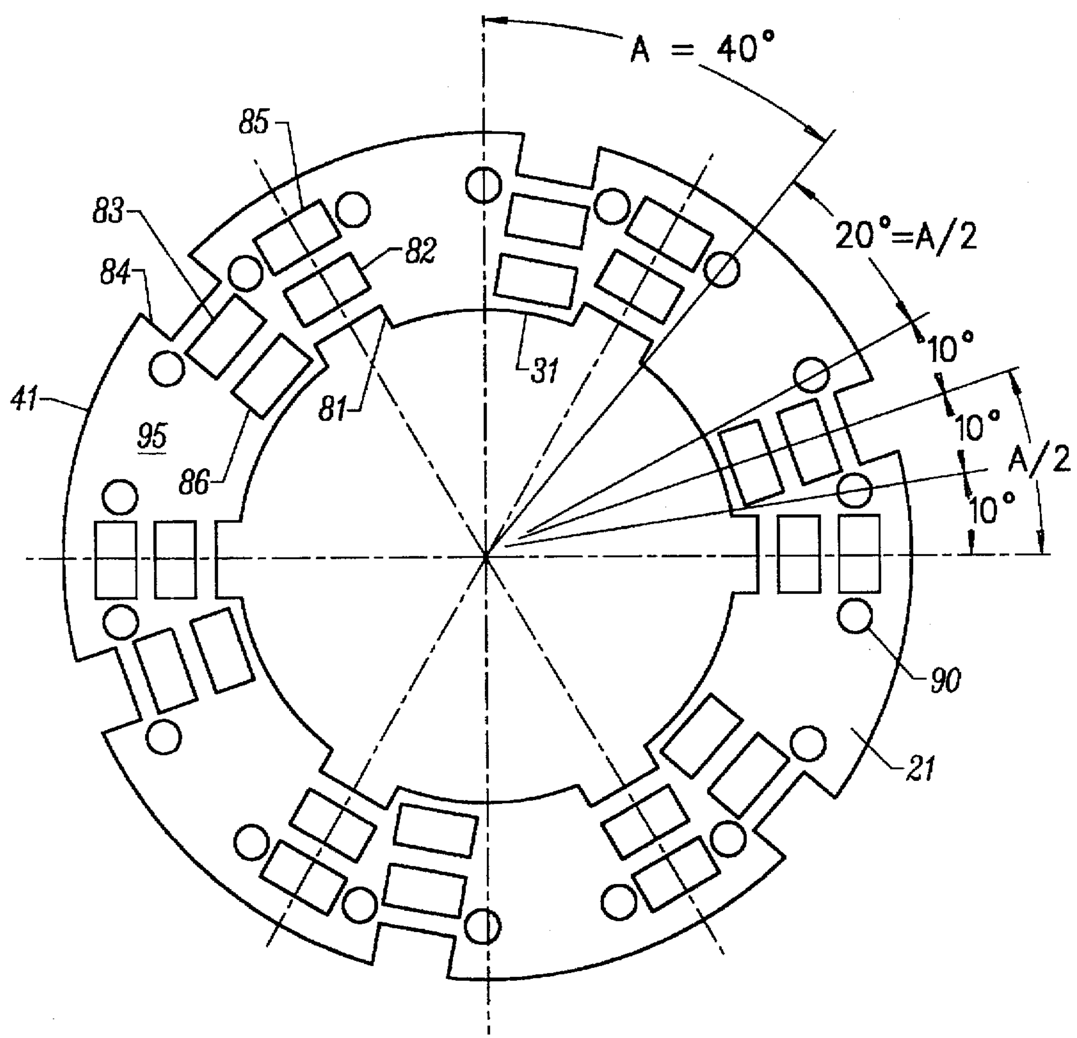
FIG. 5 is a plan view of an alternative plate design according to the present invention.

It is to be understood that the hole patterns can be varied with respect to the size, shape and placement of the holes. The number of hole patterns on each plate can also be varied as can the number of plates included in each tortuous pathway. FIG. 5 shows an alternate hole pattern using six rectangular openings in each pattern. The fifth and sixth holes 85 and 86, respectively, shown in FIG. 5 are simply added to the pattern as interior holes positioned between the inner and outer edges 31 and 41 of the plate and are angularly aligned with the first and fourth holes 81 and 84 respectively but are radially offset from the other holes in the pattern.

An additional significant advantage of the present invention is that the design avoids the presence of a "deadband" which occurs in certain prior art designs as the plug 15 moves across one of the plurality of plates. In the present design, as plug 15 moves upwardly across plate 25, for example, there is steadily increased flow as the plug moves from the bottom of plate 25 to the top of plate 25. This steadily increased flow continues without interruption when going from plate 25 across plate 24.

Each of the plates, according to the present invention, is relatively easy and inexpensive to manufacture. The surface finish of the edges of the holes can be altered during the manufacturing process to create varying degrees of roughness to provide a desired amount of friction between the high pressure fluid and the sides of the passageways. It is also apparent that the size, shape and placement of the hole patterns and the dimensions of each of the plates can be readily changed and adapted for different design requirements. The hole patterns and pathways are preferably identical, but do not have to be so designed.

Each of the identical tortuous pathways includes multiple episodes of sudden contraction, sudden expansion, and change of direction; frictional engagement with sidewalls as well as flow through at least two adjacent plates are also present in each pathway. As fluid passes through the restrictions formed by the hole patterns between adjacent plates, the fluid experiences sudden contraction, sudden expansion and change of direction. By rotating the plates A/2 degrees in the same rotational direction, a uniform and symmetrical pattern of tortuous pathways is provided.

Changes may be made in the hole pattern and in the design of the plates without departing from the spirit of this invention.

What is claimed is:

1. A valve trim body for a flow control valve, wherein said flow control valve has a body with a passage extending therethrough, said body having a seat formed therein, a plug movable relative to said seat, said valve trim body forming a cage around said plug and comprising:

a plurality of perforated plate means stacked together, each of said plate means being generally ring-shaped, having inner and outer edges and having hole patterns formed therein whereby fluid flowing between said inner and outer edges must flow through one of a plurality of tortuous paths, each of which includes at least two of said plates, and wherein said hole pattern on each plate is a repeating pattern of four offset holes wherein the first of said four holes communicates with and opens into said inner edge of said plate, the second hole is angularly aligned with said first hole, and said second hole does not open into said inner or said outer edge, the third hole and fourth holes are each offset angularly and radially with respect to said first and second holes, said third and fourth holes are angularly aligned with each other, said third hole does not open into said inner or outer edge, and said fourth hole communicates with and opens into said outer edge of said plate, and each repeating pattern on a single plate is separated by a region without perforations.

2. The apparatus of claim 1 wherein said pattern of four offset holes subtends an arc of A degrees, each of said regions without perforations subtends an arc of A/2 degrees, and wherein each of said plurality of plates is rotated A/2 degrees relative to the adjacent plate.

3. The apparatus of claim 2 wherein each of said plurality of plates is rotated A/2 degrees in the same rotational direction relative to each adjacent plate.

4. The apparatus of claim 3 wherein each of said plates has a series of circular holes formed therein and further comprising a plurality of bolts extending through said circular holes for holding said plates together.

5. The apparatus of claim 1 wherein said plurality of tortuous paths are identical, and each path includes the first and second hole of said pattern on one of said plates and the third and fourth hole of said pattern on an adjacent plate.

6. The apparatus of claim 5 where said valve trim body has two end plates and each of said tortuous paths has a boundary formed by either an end plate or by one of said regions without perforations.

7. The apparatus of claim 1 wherein each hole of said repeating pattern is rectangular in shape.

* * * * *